United States Patent
Thomas et al.

(10) Patent No.: US 11,850,979 B2
(45) Date of Patent: Dec. 26, 2023

(54) SEAT MOUNTED KNEE BOLSTER

(71) Applicant: GM Global Technology Operations LLC, Detroit, MI (US)

(72) Inventors: Scott D. Thomas, Novi, MI (US); Chin-hsu Lin, Troy, MI (US); George H. Baker, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 22 days.

(21) Appl. No.: 17/685,768

(22) Filed: Mar. 3, 2022

(65) Prior Publication Data

US 2023/0278472 A1 Sep. 7, 2023

(51) Int. Cl.
*B60N 2/427* (2006.01)
*B60N 2/42* (2006.01)
*B60N 2/90* (2018.01)
*B60R 21/00* (2006.01)

(52) U.S. Cl.
CPC ........... *B60N 2/427* (2013.01); *B60N 2/4214* (2013.01); *B60N 2/43* (2013.01); *B60N 2/995* (2018.02); *B60N 2/4279* (2013.01); *B60N 2/42772* (2013.01); *B60R 2021/0051* (2013.01); *B60R 2021/0053* (2013.01)

(58) Field of Classification Search
None
See application file for complete search history.

(56) References Cited

U.S. PATENT DOCUMENTS

| | | | | | |
|---|---|---|---|---|---|
| 4,099,743 | A | * | 7/1978 | Non | B60R 21/02 280/753 |
| 5,476,283 | A | * | 12/1995 | Elton | B60R 21/02 280/752 |
| 2003/0188908 | A1 | * | 10/2003 | Abe | B60R 21/01516 180/282 |
| 2004/0046377 | A1 | * | 3/2004 | Meduvsky | B60R 21/02 280/752 |
| 2004/0169363 | A1 | * | 9/2004 | Fukawatase | B60R 21/0132 280/752 |

(Continued)

FOREIGN PATENT DOCUMENTS

DE 9405366 U1 6/1994
DE 10361227 A1 7/2005

(Continued)

*Primary Examiner* — David E Allred
(74) *Attorney, Agent, or Firm* — Vivacqua Crane PLLC

(57) ABSTRACT

A knee bolster assembly for a vehicle seat includes a knee bolster moveably mounted in proximity to the vehicle seat, the knee bolster selectively moveable between a first position, wherein a passenger is able to enter and exit the vehicle seat, and a second position, wherein the knee bolster is positioned directly in front of a seating surface of the vehicle seat, such that legs of a passenger seated within the vehicle seat are positioned between the seating surface of the vehicle seat and the knee bolster, the knee bolster adapted to prevent an occupant of the vehicle seat from sliding forward off the vehicle seat and restrict any hyper-extending of their lower legs due to forward inertia, and an energy absorbing device adapted to absorb energy when knees or legs of a passenger within the vehicle seat impact the knee bolster.

11 Claims, 7 Drawing Sheets

(56) References Cited

U.S. PATENT DOCUMENTS

| | | | | |
|---|---|---|---|---|
| 2015/0028642 A1* | 1/2015 | Evans | ............... | B64D 11/0607 |
| | | | | 29/434 |
| 2015/0166185 A1* | 6/2015 | Oleson | ............... | B60N 2/42727 |
| | | | | 297/216.1 |
| 2016/0297392 A1* | 10/2016 | Schneider | ............. | B60R 21/231 |
| 2019/0389414 A1* | 12/2019 | Masuda | ................ | B60R 21/207 |
| 2020/0376989 A1* | 12/2020 | Simecek | .............. | B64D 11/062 |
| 2022/0266730 A1* | 8/2022 | Ohno | ................. | B60N 2/0244 |

FOREIGN PATENT DOCUMENTS

| | | | | | |
|---|---|---|---|---|---|
| EP | 1870297 | A1 * | 12/2007 | ........... | B60R 21/045 |
| GB | 190212813 | A * | 10/1902 | | |
| JP | 2679405 | B2 * | 11/1997 | | |
| JP | 2004168096 | A * | 6/2004 | ............. | B60R 21/02 |
| JP | 2010075421 | A * | 4/2010 | | |
| WO | WO-2020231511 | A1 * | 11/2020 | ......... | B60R 21/0136 |

\* cited by examiner

SEAT MOUNTED KNEE BOLSTER

INTRODUCTION

The present disclosure relates to a knee bolster for a vehicle seat. Knee bolsters are often employed as interior components on motor vehicles. Typically, the knee bolster is mounted to an instrument panel on the motor vehicle. During a frontal impact of the motor vehicle, the knee bolster provides a first contact surface for knees of a seated occupant and to aid in cushioning and directing the knees. When a collision is taking place, a submarining phenomena occurs such that the lower part of the body of a driver or a passenger occupying a vehicle seat is forcibly pushed down to be put under the instrument panel due to inertia. In this case, the knee of the driver or the passenger sitting in the vehicle seat is thrust forward into the framework of the vehicle. Additionally, upper parts of the body of the driver or passenger of the vehicle are inclined to move forward due to the submarining phenomena.

Even in vehicles with collision air bags, a vehicle passenger can "submarine" below an inflated airbag. Knee bolsters are installed to the front of the instrument panel for absorbing the impact upon the driver or passenger during a frontal collision. This prevents or stops an occupant from submarining underneath the inflated air bag. The knee bolster then deforms or crushes under the load, absorbing energy and minimizing the forces acting on the occupant's legs, so that the impact upon the knee of the passengers is decreased while preventing or reducing the inadvertent influence of the submarining phenomena. The knee bolster also provides energy management of a lower torso of the occupant and load transmission to other members, for example, energy absorption brackets and the support structure for the instrument panel.

In autonomous vehicles, a vehicle seat may not be positioned within proximity of the instrument panel to allow effect usage of such instrument panel mounted knee bolsters. Thus, while current vehicle knee bolsters achieve their intended purpose, there is a need for a new and improved knee bolster assembly that provides a knee bolster moveably mounted onto the vehicle seat.

SUMMARY

According to several aspects of the present disclosure, a knee bolster assembly for a vehicle seat includes a knee bolster moveably mounted in proximity to the vehicle seat, the knee bolster selectively moveable between a first position, wherein a passenger is able to enter and exit the vehicle seat, and a second position, wherein the knee bolster is positioned directly in front of a seating surface of the vehicle seat, such that legs of a passenger seated within the vehicle seat are positioned between the seating surface of the vehicle seat and the knee bolster, the knee bolster adapted to prevent an occupant of the vehicle seat from sliding forward off the vehicle seat and restrict any hyper-extending of their lower legs due to forward inertia, and an energy absorbing device adapted to absorb energy when knees or legs of a passenger within the vehicle seat impact the knee bolster.

According to another aspect, the knee bolster includes a rigid reaction plate and a padded member, the padded member attached to a surface of the rigid reaction plate facing the seating surface of the vehicle seat when the knee bolster is in the second position and made from a deformable material adapted to absorb energy when a generally perpendicular force is applied to the knee bolster by the knees of a passenger within the vehicle seat.

According to another aspect, the knee bolster assembly further includes a locking mechanism adapted to secure the knee bolster in the second position, and at least one of a manual release and an automatic release adapted to allow selective release of the locking mechanism.

According to another aspect, the knee bolster assembly further includes external markings in proximity to the locking mechanism adapted to provide an indication of a location of the locking mechanism to direct a mechanic or first responder to the location of the locking mechanism.

According to another aspect, the knee bolster is pivotally moveable between the first position and the second position.

According to another aspect, the energy absorbing device includes a torsion bar positioned between and interconnecting the knee bolster to one of the vehicle seat and a structure adjacent the vehicle seat, the knee bolster pivotally moveable between the first position and the second position about an axis of the torsion bar, wherein, when the knee bolster is locked in the second position, force applied by a passenger's knees onto the knee bolster is at least partially absorbed by the torsion bar.

According to another aspect, the knee bolster is slidably moveable between the first position and the second position.

According to another aspect, the knee bolster is adapted to be manually moved between the first position and the second position by a passenger seated within the vehicle seat.

According to another aspect, the knee bolster assembly further includes a first motor element adapted to move the knee bolster between the first position and the second position, wherein the knee bolster is adapted to automatically move from the first position to the second position in response to at least one of a plurality of first pre-determined conditions, and to move from the second position to the first position in response to at least one of a plurality of second pre-determined conditions.

According to another aspect, the knee bolster is adapted to automatically move from the first position to the second position only when a passenger restraint system for the passenger seated within the vehicle seat is engaged.

According to another aspect, the knee bolster includes a first portion moveably mounted in proximity to a first side of the vehicle seat and a second portion moveably mounted in proximity to a second side of the vehicle seat, each of the first and second portions moveable between a first position, wherein a passenger is able to enter and exit the vehicle seat, and a second position, wherein the first portion and the second portion are positioned directly in front of a seating surface of the vehicle seat, such that legs of a passenger seated within the vehicle seat are positioned between the seating surface of the vehicle seat and the first and second portions of the knee bolster.

According to another aspect, when the knee bolster is in the second position, the knee bolster is adapted to selectively, at least one of, translate and rotate relative to the seating surface of the vehicle seat.

According to another aspect, the knee bolster assembly further includes a second motor element adapted to move the knee bolster in at least one of translation motion and a rotation motion relative to the seating surface of the vehicle seat, the knee bolster adapted to automatically move closer to the seating surface of the vehicle seat and reduce a distance between a passenger's knees and the knee bolster in response to detection of an imminent collision.

According to another aspect, the energy absorbing device is adapted to allow dampened generally perpendicular movement of the knee bolster when a perpendicular force is applied to the knee bolster by the knees of a passenger within the vehicle seat.

According to several aspects of the present disclosure, a knee bolster assembly for vehicle seat includes a knee bolster adapted to prevent an occupant of the vehicle seat from sliding forward off the vehicle seat and prevent hyper-extension of the occupant's lower legs due to forward inertia, the knee bolster having a first portion moveably mounted in proximity to a first side of the vehicle seat and a second portion moveably mounted in proximity to a second side of the vehicle seat/adjacent vehicle structure, each of the first and second portions including a reaction plate which is selectively moveable between a first position, wherein a passenger is able to enter and exit the vehicle seat, and a second position, wherein the first and second portions are positioned directly in front of a seating surface of the vehicle seat, such that legs of a passenger seated within the vehicle seat are positioned between the seating surface of the vehicle seat and the first and second portions, a locking mechanism adapted to secure the knee bolster in the second position, and one of a manual release and an automatic release adapted to allow selective release of the locking mechanism, an energy absorbing device adapted to absorb energy when the knee bolster is secured by the locking mechanisms in the second position and legs of a passenger within the vehicle seat impact the first and second portions of the knee bolster, a first motor element, the first motor element within the first portion of the knee bolster adapted to move the first portion of the knee bolster between the first position and the second position, and the first motor element within the second portion of the knee bolster adapted to move the second portion of the knee bolster between the first position and the second position, wherein the first motor elements are adapted to automatically move the first and second portions of the knee bolster from the first position to the second position when a passenger restraint system for the passenger seated within the vehicle seat is engaged and in response to at least one of a plurality of first pre-determined conditions, and to move the first and second portions of the knee bolster from the second position to the first position in response to at least one of a plurality of second pre-determined conditions.

According to another aspect, each of the first and second portions of the knee bolster further includes a second motor element, when the first and second portions of the knee bolster are in the second position, each of the first and second portions of the knee bolster are selectively moveable horizontally relative to the seating surface of the vehicle seat, the second motor element within each of the first and second portions of the knee bolster adapted to automatically move the first and second portions of the knee bolster closer to the seating surface of the vehicle seat and reduce a distance between a passenger's knees and the knee bolster.

According to another aspect, each of the first and second portions of the knee bolster are pivotally moveable between the first position and the second position, and the energy absorbing device within each of the first and second portions includes a torsion bar, each of the first and second portions of the knee bolster pivotally moveable between the first position and the second position about an axis of the torsion bar therein, wherein, when the knee bolster is locked in the second position, force applied by a passenger's knees onto the knee bolster is at least partially absorbed by the torsion bar.

According to several aspects of the present disclosure, a vehicle seat including a knee bolster assembly includes a knee bolster moveably mounted in proximity to the vehicle seat, the knee bolster including a reaction plate and selectively moveable between a first position, wherein a passenger is able to enter and exit the vehicle seat, and a second position, wherein the knee bolster is positioned directly in front of a seating surface of the vehicle seat, such that legs of a passenger seated within the vehicle seat are positioned between the seating surface of the vehicle seat and the knee bolster, the knee bolster assembly further adapted to prevent an occupant of the vehicle seat from sliding forward off the vehicle seat and limit hyper-extension of the occupant's lower legs due to forward inertia, a locking mechanism adapted to secure the knee bolster in the second position, and one of a manual release and an automatic release adapted to allow selective release of the locking mechanism, an energy absorbing device adapted to absorb energy when perpendicular force is applied to the knee bolster by the knees of a passenger within the vehicle seat, and a first motor element adapted to move the knee bolster between the first position and the second position, wherein the knee bolster is adapted to automatically move from the first position to the second position in response to at least one of a plurality of first pre-determined conditions, and to move from the second position to the first position in response to at least one of a plurality of second pre-determined conditions.

According to another aspect, the vehicle seat further includes a second motor element, wherein, when the knee bolster is in the second position, the knee bolster is selectively moveable horizontally relative to the seating surface of the vehicle seat, the second motor element adapted to automatically move the knee bolster closer to the seating surface of the vehicle seat and reduce a distance between a passenger's knees.

According to another aspect, the knee bolster includes a first portion moveably mounted in proximity to a first side of the vehicle seat and a second portion moveably mounted in proximity to a second side of the vehicle seat, each of the first and second portions moveable between a first position, wherein a passenger is able to enter and exit the vehicle seat, and a second position, wherein the first portion and the second portion are positioned directly in front of a seating surface of the vehicle seat, such that legs of a passenger seated within the vehicle seat are positioned between the seating surface of the vehicle seat and the first and second portions of the knee bolster.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
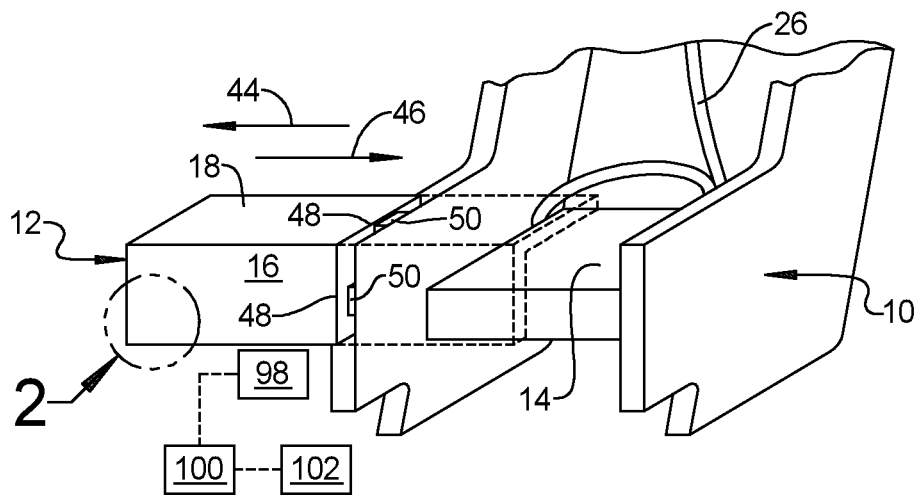
FIG. 1 is a perspective view of a vehicle seat with a knee bolster assembly according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a vehicle seat 10 equipped with a knee bolster assembly 12 in accordance with the present disclosure is shown. The vehicle seat 10 includes a seating surface 14 onto which a passenger of the vehicle sits. The knee bolster assembly 12 that includes a knee bolster 16 is moveably mounted onto the vehicle seat 10 or adjacent vehicle structure. The knee bolster 16 is selectively moveable between a first position and a second position. When the knee bolster 16 is in the first position, as shown in solid in FIG. 1, a passenger is able to enter and exit the vehicle seat 10. When the knee bolster 16 is in the second position, as shown in shadow in FIG. 1, the knee bolster 16 is positioned directly in front of the seating surface 14 of the vehicle seat 10, such that legs of a passenger seated within the vehicle seat 10 are positioned between the seating surface 14 of the vehicle seat 10 and the knee bolster 16. As shown in FIG. 1, the knee bolster 16 includes a tray portion 18 that provides a working surface for the passenger when the knee bolster 16 is in the second position. The knee bolster 16 and tray portion 18 have an L-shaped cross section, as shown in FIG. 1. When in the second position, the tray portion 18 is located above the seating surface 14, as shown in FIG. 1.

Figure 3:
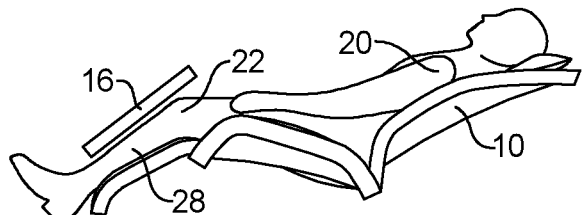
FIG. 3 is a side view of a passenger seated within a vehicle seat having a knee bolster according to an exemplary embodiment of the present disclosure.
Figure 4:
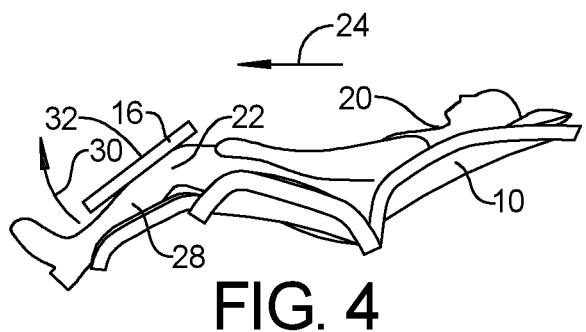
FIG. 4 is a side view of a passenger seated within a vehicle seat having a knee bolster according to an exemplary embodiment of the present disclosure, wherein the passenger has been forced forward into the knee bolster.

The knee bolster 16 is adapted to prevent an occupant of the vehicle seat 10 from sliding forward off the vehicle seat 10 and any hyper-extension of the occupant's lower legs due to forward inertia. Referring to FIG. 3, wherein no forward inertia is acting on the passenger 20 within the vehicle seat 10, and the knee bolster 16 is positioned in the second position, directly in front of the knees 22 of the passenger 20. Referring to FIG. 4, during a frontal collision, or upon sudden application of the vehicle's brakes, forward inertia will force the passenger 20 forward relative to the vehicle seat 10, as indicated by arrow 24. In the event the passenger 20 is held within the vehicle seat by a passive restraint system, such as a seatbelt 26, forward motion of the torso of the passenger 20 will be stopped, however, inertia may cause lower legs 28 of the passenger 20 to swing upward, as indicated by arrow 30.

Upon forward motion of the passenger 20, the knees 22 of the passenger 20 will contact the knee bolster 16, wherein, the knee bolster 16 stops further forward motion of the passenger 20. Additionally, the knee bolster 16 prevents upward motion of the lower portion 28 of the passenger's legs. The knee bolster 16 further includes an energy absorbing device 32 that is adapted to absorb energy when the knees 22 and lower legs 28 of the passenger 20 within the vehicle seat 10 impact the knee bolster 16.

Figure 5:
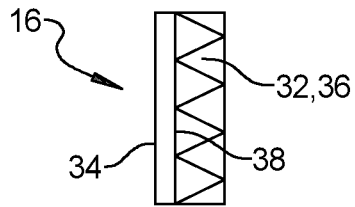
FIG. 5 is a cross sectional view of a knee bolster according to an exemplary embodiment, having a reaction plate and a padded member.

Referring to FIG. 5, in an exemplary embodiment the knee bolster 16 includes a rigid reaction plate 34 and the energy absorbing device 32 includes a padded member 36. The padded member 36 is attached to a front surface 38 of the rigid reaction plate 34 facing the seating surface 14 of the vehicle seat 10 when the knee bolster 16 is in the second position. Thus, the knees 22 and lower legs 28 of the passenger 20 within the vehicle seat 10 come into contact with the padded member 36 which cushions the impact and absorbs energy. The padded member 36 is made from a deformable material that is adapted to absorb energy when a perpendicular force is applied to the knee bolster 16 by the knees 22 and lower legs 28 of a passenger 20 within the vehicle seat 10. The padded member 36 may be made from foam, of from a crushable plastic design, such as shown in FIG. 5, a honeycomb design or any combination of these.

Figure 2:
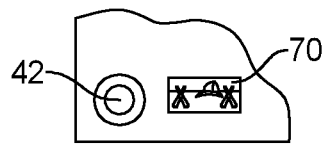
FIG. 2 is an enlarged portion of FIG. 1, as indicated by "FIG. 2" in FIG. 1.
Figure 6:
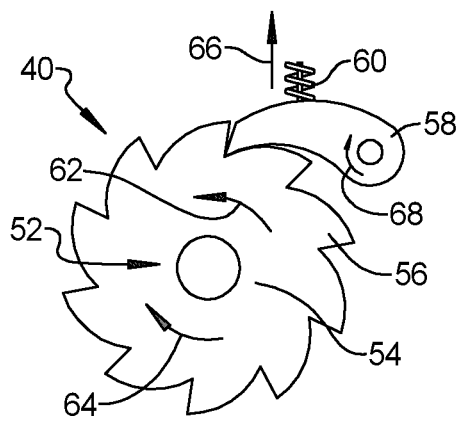
FIG. 6 is schematic view of a locking mechanism according to an exemplary embodiment.
Figure 13:
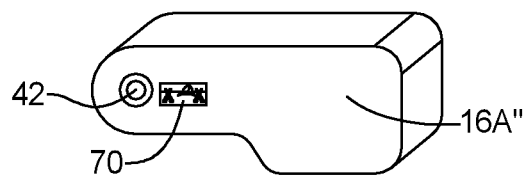
FIG. 13 is a perspective view of the first portion of the knee bolster shown in FIG. 12.

In an exemplary embodiment, the knee bolster assembly 12 as shown in FIG. 1 includes a locking mechanism 40 as shown in FIG. 6 adapted to secure the knee bolster 16 as shown in FIG. 1 in the second position, and a manual release 42 as shown in FIG. 2 and FIG. 13 adapted to allow selective release of the locking mechanism 40 via a mechanical interface to the locking mechanism 40.

Referring to FIG. 1, the knee bolster 16 is slidably moveable between the first position and the second position, as indicated by arrows 44, 46. The knee bolster 16 includes lateral tracks 48 which slidably engage rails 50 on the vehicle seat 10 or adjacent vehicle structure. The locking mechanism 40 is mounted onto the knee bolster assembly 12 and engages the rails 50 on the vehicle seat 10 to prevent sliding movement of the knee bolster 16 on the rails 50, thus locking the knee bolster 16 in the second position. The locking mechanism 40 may comprise elements that frictionally engage or interlock with the rails 50, the vehicle seat 10 or the adjacent vehicle structure to prevent motion of the knee bolster 16 from the second position. Alternatively, the locking mechanism 40 may be attached to the vehicle seat 10, the adjacent vehicle structure and frictionally engage or interlock with the rails 50 or the knee bolster assembly 12.

Referring to FIG. 6, in an exemplary embodiment, the locking mechanism 40 comprises a ratchet mechanism 52 that provides a positive stop to prevent the knee bolster 16 from moving from the second position. The ratchet mechanism 52 includes a rotating cog 54 that is geared via a rack and pinion approach (not shown) to rotate with motion of the knee bolster 16 between the first and second positions. The rotating cog 54 includes teeth 56 that engage a pawl 58 which is biased by a spring 60 into engagement with the teeth 56 of the rotating cog 54. The pawl 58 allows the rotating cog 54 to rotate in a first direction, as indicated by arrow 62, when the knee bolster 16 moves from the first position to the second position, as indicated by arrow 46 in FIG. 1. Once the knee bolster is in the second position, the pawl 58 prevents rotation of the rotating cog 54 in a second direction, as indicated by arrow 64, thus preventing movement of the knee bolster from the second position toward the first position.

The manual release 42 dis-engages the locking mechanism 40, and allows the knee bolster 16 to move from the second position to the first position. In the exemplary embodiment shown in FIG. 6, the manual release 42 allows manual override of the spring 60 and pushes the pawl 58 away from engagement with the teeth 56 of the rotating cog 54, as indicated by arrow 66, thus allowing rotation of the rotating cog 54 in the second direction, as indicated by arrow 64, and movement of the knee bolster 16 from the second position to the first position, as indicated by arrow 44 in FIG. 1. The manual release 42 may push the pawl 58 out of plane with the rotating cog 54, or rotate the pawl 58 away from the rotating cog 54, as indicated by arrow 68, such that the pawl 58 no longer engages the teeth 56 of the rotating cog 54. The manual release 42 may be a simple mechanical actuator, or alternatively, may be an electronic or automated release such as a switch that prompts a solenoid or electronic actuator.

In an exemplary embodiment as shown in FIG. 2 and FIG. 13, the knee bolster 16 includes external markings 70 in proximity to the locking mechanism 40 that are adapted to provide an indication of a location of the locking mechanism 40. The external markings 70 identify a cut zone so the locking mechanism 40 can be disconnected in the event the manual or electronic/automated release 42 has experienced a mechanical failure, power loss or damage during a collision. This will allow a first responder or operator of the vehicle to quickly identify the location of the locking mechanism 40 and where to cut through the locking mechanism or the knee bolster or seat adjacent the locking mechanism, to allow a first responder to release the knee bolster 16, move the knee bolster 16 from the second position to the first position, or completely remove the knee bolster and extricate the passenger, in the event of mechanical failure of the manual release 42 during a crash.

Figure 7:
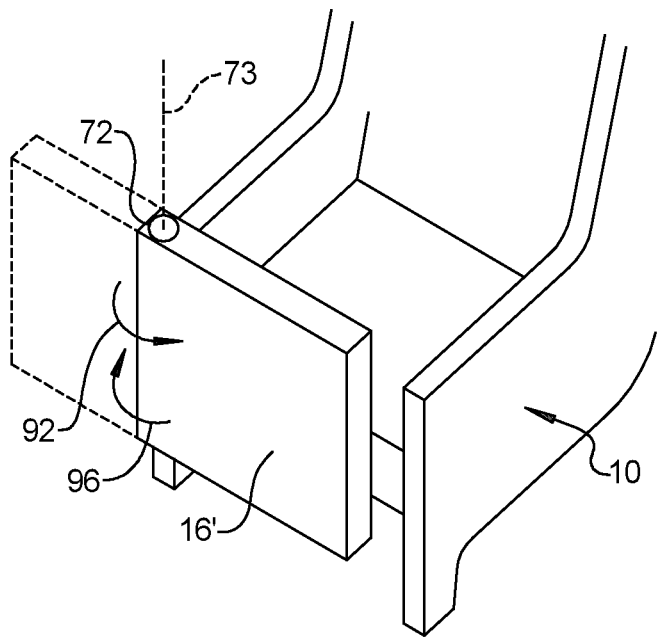
FIG. 7 is a perspective view of a one-piece knee bolster that rotates about a vertical axis between a first and second position.
Figure 8:
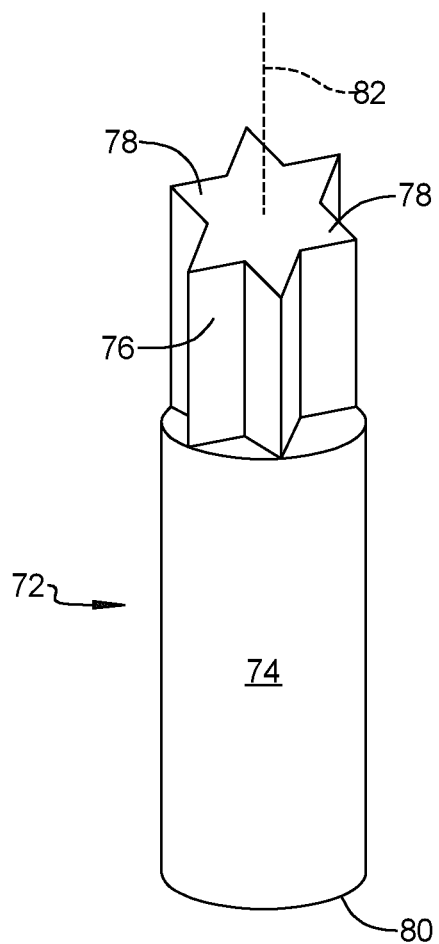
FIG. 8 is a perspective view of a support shaft in accordance with an exemplary embodiment, including an extension with teeth and a torsion bar.

Referring to FIG. 7, in another exemplary embodiment, the knee bolster 16' is pivotally moveable between the first position and the second position. The knee bolster 16' is rotatably supported on a support shaft 72 and rotates between the first position, shown in shadow in FIG. 7, and the second position, as shown in solid in FIG. 7, about a generally vertical axis 73. In another exemplary embodiment as shown in FIG. 8, the energy absorbing device 32 further includes a torsion bar 74 positioned between and interconnecting the knee bolster 16 to the vehicle seat 10 or adjacent vehicle structure. Here, the torsion bar 74 is incorporated within the support shaft 72 that supports the knee bolster 16'.

Continuing with FIG. 8, the support shaft 72 includes a torsion bar 74 and an extension 76 that includes teeth 78. A bottom 80 of the torsion bar 74 is fixedly attached to a structure of the vehicle seat 10 or adjacent vehicle structure. The knee bolster 16' is supported on the support shaft 72, and rotates relative to the support shaft 72 about a central axis 82 of the support shaft 72.

Figure 9:
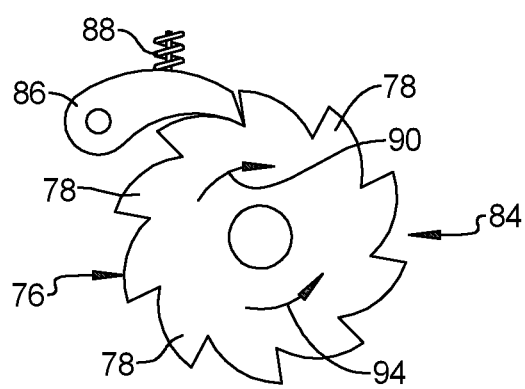
FIG. 9 is schematic view of a locking mechanism for the vehicle seat and knee bolster shown in FIG. 7.

Referring to FIG. 9, in an exemplary embodiment, the locking mechanism 40 comprises a ratchet mechanism 84 that provides a positive stop to prevent the knee bolster 16' from moving from the second position. The ratchet mechanism 84 includes a pawl 86 positioned within the knee bolster assembly 12 which is biased by a spring 88 to engage the teeth 78 on the extension 76 of the support shaft 72. The pawl 86 allows the knee bolster 16' to rotate in a first direction, as indicated by arrow 90, when the knee bolster 16' moves from the first position to the second position, as indicated by arrow 92 in FIG. 7. Once the knee bolster 16' is in the second position, the pawl 86 prevents rotation of the knee bolster 16' in a second direction, as indicated by arrow 94, thus preventing movement of the knee bolster 16' from the second position toward the first position, as indicated by arrow 96 in FIG. 7.

Engagement of the pawl 86 within the knee bolster 16' and the teeth 78 of the extension 76 on the support shaft 72 prevents rotational movement of the knee bolster 16' relative to the support shaft 72, from the second position toward the first position. When force is applied to the knee bolster 16' by the knees 22 of a passenger 20 during a frontal collision or sudden braking, such force will apply torque to the extension 76 of the support shaft 72 which is absorbed by the torsion bar 74. The torsion bar 74 may be hollow or a solid bar. The torsional resistance of the torsion bar 74 is based on the yield stress of the torsion bar 74. The torsional resistance should be large enough to prevent the passenger 20 within the vehicle seat 10 from sliding forward, but small enough to absorb sufficient energy to prevent injury to the passenger 20. It should be understood that the structure could be reversed, wherein the torsion bar 74 of the support shaft 72 is fixedly attached to the knee bolster 16', and the pawl 86 is attached to the vehicle seat 10 or adjacent structure, without departing from the scope of the present disclosure.

In an exemplary embodiment, the knee bolster 16 is adapted to be manually moved between the first position and the second position by a passenger 20 seated within the vehicle seat 10. For example, referring again to FIG. 1, when a passenger 20 sits within the vehicle seat 10, the passenger manually slides the knee bolster 16 from the first position to the second position, as indicated by arrow 46. When the passenger 20 desires to exit the vehicle seat 10, the passenger 20 manually dis-engages the locking mechanism 40 by applying the manual release 42 and slides the knee bolster 16 from the second position to the first position, as indicated by arrow 44.

In another exemplary embodiment, the knee bolster assembly 12 further includes a first motor element 98 adapted to move the knee bolster 16 between the first position and the second position. The first motor element 98 is controlled by a controller 100 that is in communication with sensors 102 within the vehicle. The sensors 102 may include, but are not limited to, sensors within the vehicle seat 10 or in another location within the vehicle that detect the presence of a passenger, sensors on the knee bolster assembly that detect leg proximity or contact, sensors on the vehicle seat 10 or knee bolster assembly 12 that detect occupant pinching during closure or opening, sensors that detect seat belt buckling, sensors within the vehicle that detect operating parameters of the vehicle such as speed, sensors within the vehicle that are adapted to anticipate braking, imminent or actual collisions, and sensors within the vehicle that detect when doors within the vehicle are open or when the vehicle is placed into a driving mode.

The controller 100 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The controller 100 will automatically move the knee bolster 16 from the first position to the second position in response to at least one of a plurality of first pre-determined conditions. Such conditions could include, but are not limited to: activation by a passenger; detection of a passenger on the seating surface 14 of the vehicle seat 10; engagement of a restraint device, such as a seatbelt 26; detection that the vehicle seat 10 has been reclined beyond a pre-determined angle; the vehicle exceeds a pre-determined speed; when panic braking occurs; when an imminent crash is detected; or when an impact is detected. For safety considerations in an autonomous vehicle, it may be a requirement that a passenger engage a seatbelt 26 prior to automatic movement of the knee bolster 16. In such embodiments, the knee bolster 16 will automatically move from the first position to the second position only when a passenger restraint system for the passenger 20 seated within the vehicle seat 10 is engaged. In addition, the movement of the knee bolster 16 may stop and reverse direction if a pinch condition of an occupant's body part has been detected by a pinch sensor. Movement of the knee bolster 16 may also stop when the legs are contacted, as determined by the contact sensor or the knee bolster has reached a certain distance away from the legs, as determined by the proximity sensor.

The knee bolster 16 will automatically move from the second position to the first position in response to at least one of a plurality of second pre-determined conditions. Such conditions may include, but are not limited to: de-activation by a passenger; dis-engagement of a restraint device, such as a seatbelt 26; detection that the vehicle seat 10 has been moved from a reclined position upward above a pre-determined angle; a door of the vehicle is opened; the vehicle has been removed from its drive mode; or the vehicle engine is shut off.

In another exemplary embodiment, the first motor element 98 is self-locking. For example, the first motor element 98 may be a worm drive with a gear ratio that provides for self-locking. The worm drive has a gear ratio that provides a high mechanical advantage and depending on the helix angle of the gear, the output cannot back-drive the input. Therefore, when the first motor element 98 moves the knee bolster 16 to the second position, the knee bolster 16 is locked in the second position.

Figure 10:
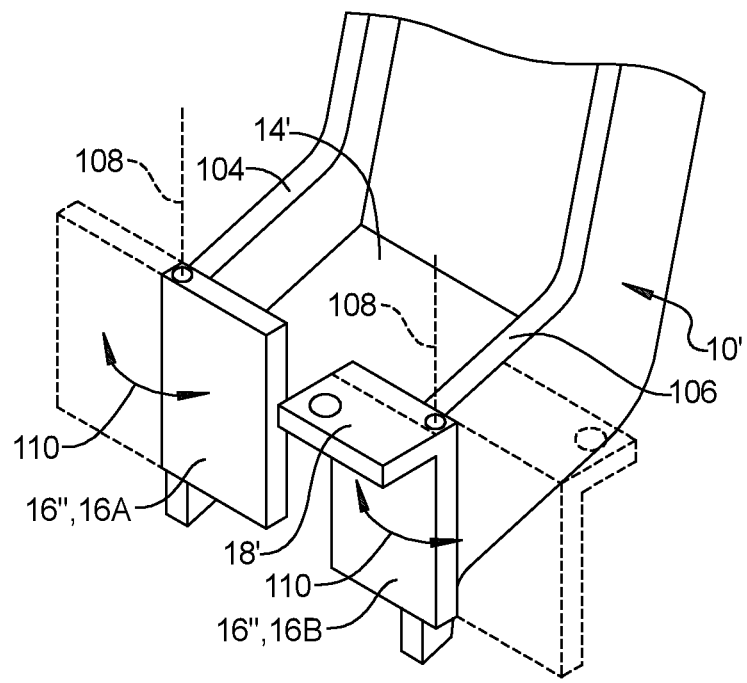
FIG. 10 is a schematic view of a vehicle seat having a seat bolster in accordance with an exemplary embodiment, with a first portion and second portion that rotate about vertical axes between first and second positions.

Referring to FIG. 10, in another exemplary embodiment, the knee bolster 16" includes a first portion 16A moveably mounted onto a first side 104 of the vehicle seat 10 and a second portion 16B moveably mounted onto a second side 106 of the vehicle seat 10'. Each of the first and second portions 16A, 16B are moveable between a first position, shown in shadow in FIG. 10, wherein a passenger 20 is able to enter and exit the vehicle seat 10, and a second position, shown in solid in FIG. 10, wherein the first portion 16A and the second portion 16B are positioned directly in front of a seating surface 14' of the vehicle seat 10', such that legs of a passenger 20 seated within the vehicle seat 10' are positioned between the seating surface 14' of the vehicle seat 10' and the first and second portions 16A, 16B of the knee bolster 16". Each of the first and second portions 16A, 16B of the knee bolster 16" rotate about a vertical axis 108, as indicated by arrows 110.

Figure 11:
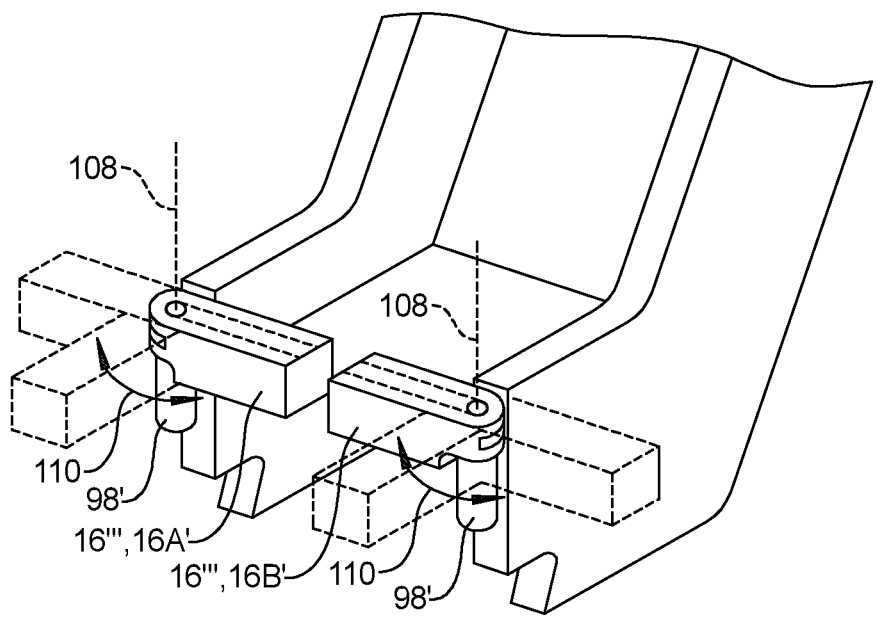
FIG. 11 is a schematic view of a vehicle seat having a seat bolster in accordance with another exemplary embodiment, with a first portion and second portion that rotate about vertical axes between first and second positions.
Figure 12:
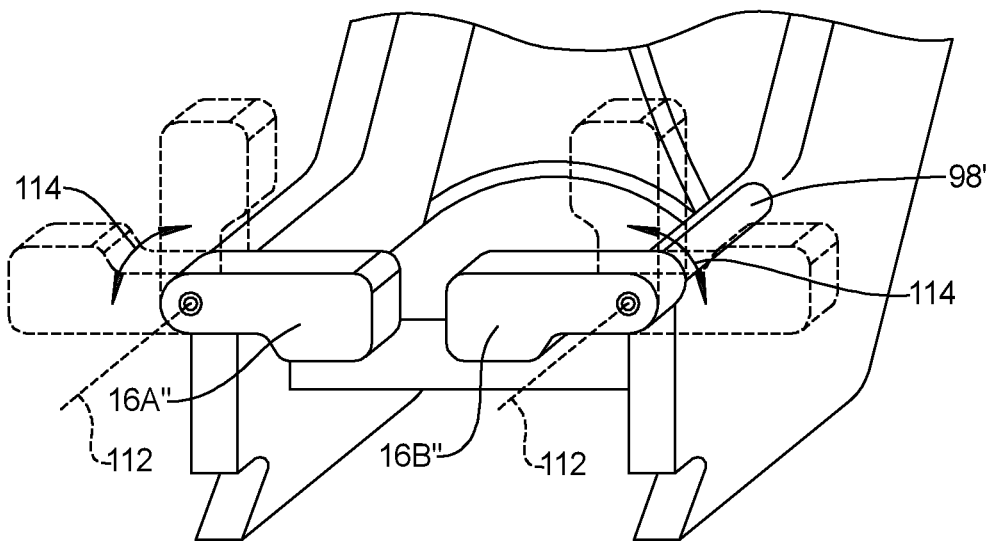
FIG. 12 is a schematic view of a vehicle seat having a seat bolster in accordance with another exemplary embodiment, with a first portion and second portion that rotate about horizontal axes between first and second positions.

In various exemplary embodiments, each of the first and second portions 16A, 16B of the knee bolster 16" shown in FIG. 10 may include features discussed above, such as a locking mechanism 40 and a torsion bar 74 for energy absorption. As shown, the second portion 16B of the knee bolster 16" includes a work surface 18' for a passenger that is useable in either the first or second positions and includes a cup holder. Referring to FIG. 11, in an exemplary embodiment, each of the first and second portions 16A', 16B' of the knee bolster 16''' include a first motor element 98' adapted to automatically rotate the first and second portions 16A', 16B' of the knee bolster 16''' between the first and second positions as discussed above. As shown in FIG. 10 and FIG. 11, the first and second portions of the knee bolster rotate between the first and second positions about a generally vertical axis, as indicated by arrows 110. Referring to FIG. 12, in another exemplary embodiment, the first and second portions 16A″, 16B″ of the knee bolster 16″″ rotate between the first and second positions about a horizontal axis 112, as indicated by arrows 114.

Referring to FIG. 13, in another exemplary embodiment, the first portion 16A″ of the knee bolster 16″″ shown in FIG. 12 includes a manual release 42 and external markings 70 in proximity to the locking mechanism 40 that are adapted to provide an indication of a location of the locking mechanism 40.

Figure 14:
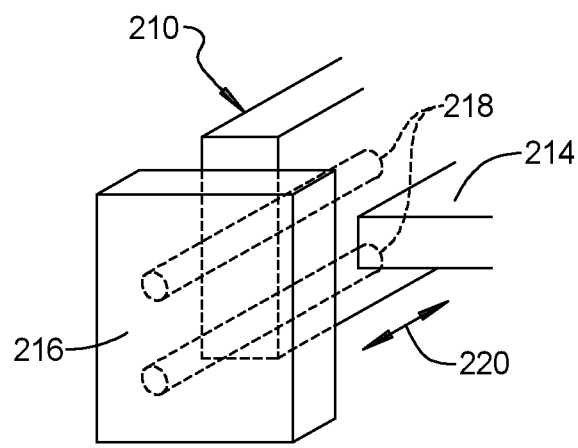
FIG. 14 is a schematic view of a vehicle seat having a knee bolster that moves horizontally back and forth relative to the seat surface of the vehicle seat.

Referring to FIG. 14, in another exemplary embodiment, when a knee bolster 216 is in the second position, the knee bolster 216 is selectively moveable horizontally relative to a seating surface 214 of the vehicle seat 210. As shown, in the simplified schematic of FIG. 14, the knee bolster 216 is supported on generally horizontal rails 218 which allow the knee bolster 216 to move back and forth relative to the seating surface 214 of the vehicle seat 210, as indicated by arrow 220. This allows the knee bolster 216 to be adjusted to accommodate passengers of varying size. This also allows a passenger seated within the vehicle seat 210 to adjust the knee bolster 216 to alter the distance between the passenger's knees and the knee bolster 216. For example, if the passenger wants to sleep, it may be advantageous to move the knee bolster 216 very close to the knees of the passenger to reduce the distance the passenger can slide forward in the event of a collision of hard braking event. Alternatively, if the passenger wants more freedom of movement, the passenger can adjust the knee bolster 216 to increase the distance between the passenger's knees and the knee bolster.

Figure 15:
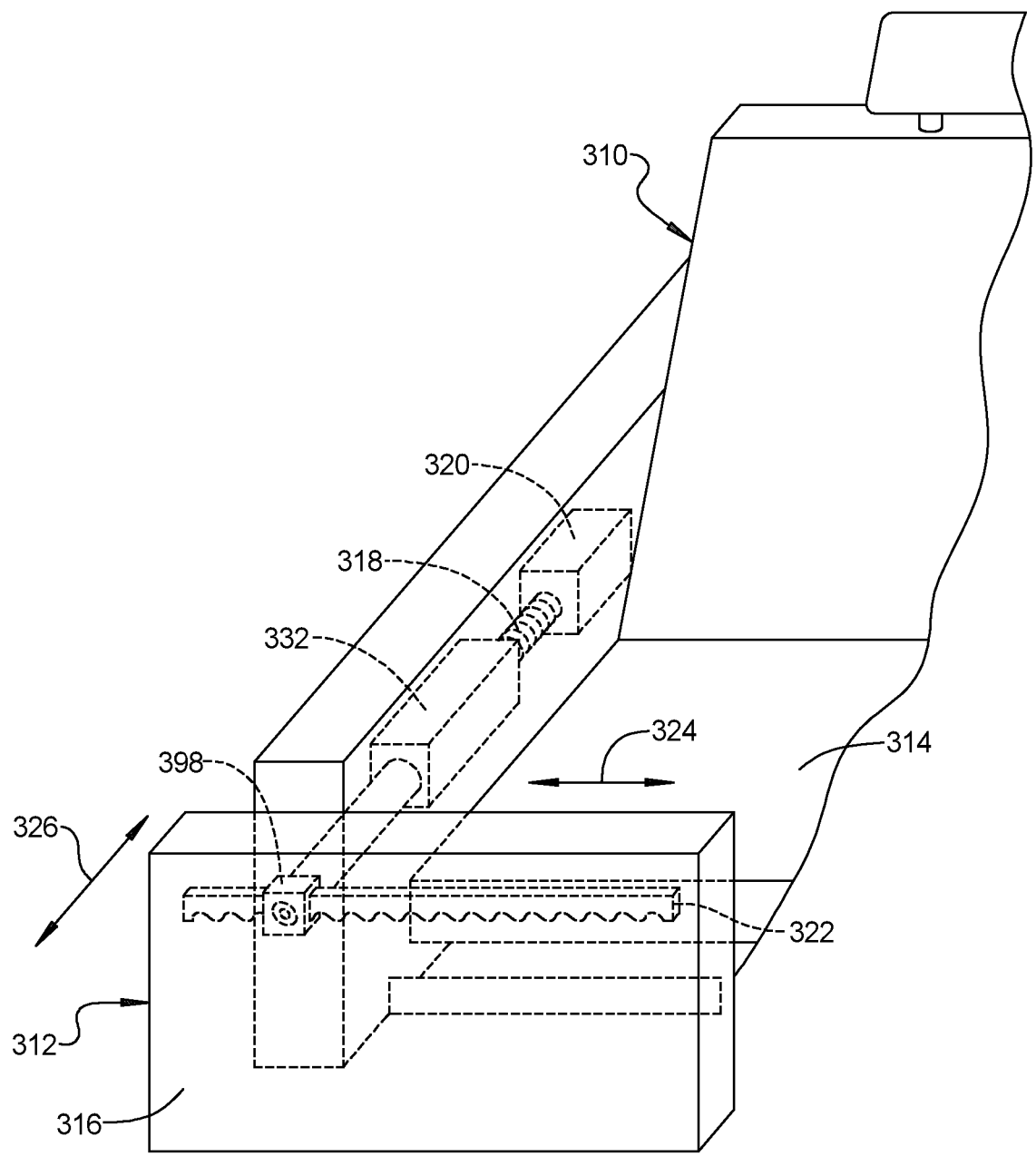
FIG. 15 is a perspective view of a vehicle seat having a knee bolster including a first motor element, a second motor element, and an energy absorbing device.

Referring to FIG. 15, in another exemplary embodiment, a vehicle seat 310 includes a knee bolster assembly 312 that includes a second motor element 320 that is adapted to move a knee bolster 316 generally horizontally relative to a seating surface 314 of the vehicle seat 310. The vehicle seat 310 is shown including a knee bolster 316 that is mounted on a horizontal support rail 318. The horizontal support rail 318 includes a first motor element 398 that engages a geared rack 322 within the knee bolster 316 to move the knee bolster 316 horizontally back and forth sideways relative to the horizontal support rail 318 between the first position and the second position, as indicated by arrow 324.

The second motor element 320 is attached to the horizontal support rail 318 and adapted to move the knee bolster 316 back and forth, fore and aft, relative to the seat surface 314 of the vehicle seat 310, as indicated by arrow 326. The second motor element 320 may comprise any conventional mover, such as a servo motor or rotational motor that engages a threaded portion of the horizontal support rail 318. The second motor element 320 is controlled by the controller 100 that is in communication with sensors 102 within the vehicle. In an exemplary embodiment, one of the sensors is adapted to detect the distance between the passengers knees 22 and the knee bolster 316 and to automatically move the knee bolster 316 horizontally closer to the passenger's knees 22 and reduce the distance between the knees 22 of the passenger 20 and the knee bolster 316 when other sensors within the vehicle detect an imminent collision.

An energy absorbing device 332 is positioned on the horizontal support rail 318 to provide energy absorption when a passenger's knees 22 impact the knee bolster 316. As shown, the energy absorbing device 332 is positioned on the horizontal support rail 318 between the second motor element 320 and the knee bolster 316. It should be understood that the energy absorbing device 332 may be connected to the support structure for the knee bolster 316 at other locations without departing from the scope of the present disclosure. The energy absorbing device 332 is adapted to allow dampened horizontal forward movement of the knee bolster 316 when horizontal forward force is applied to the knee bolster 332 by the knees 22 of a passenger 20 within the vehicle seat 310.

Figure 16:
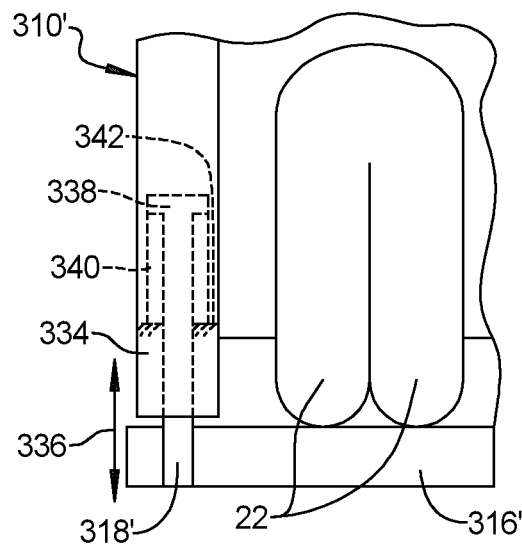
FIG. 16 is a schematic top view of a passenger seated within a vehicle seat having a knee bolster with an energy absorbing device comprising a deformable material.
Figure 17:
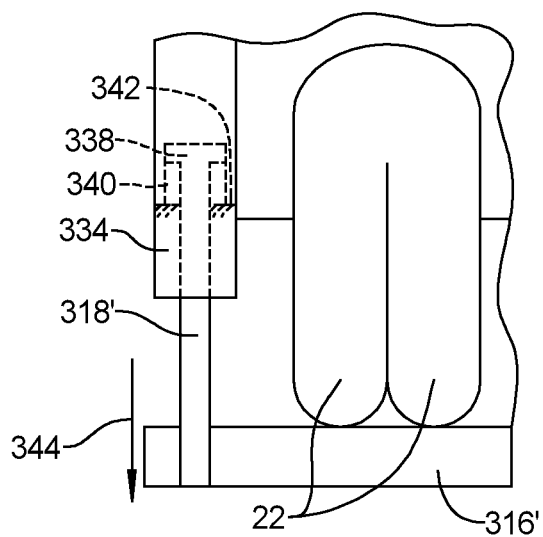
FIG. 17 is the schematic top view shown in FIG. 16, wherein the knee bolster has been moved forward and energy absorbing material has been compressed.
Figure 18:
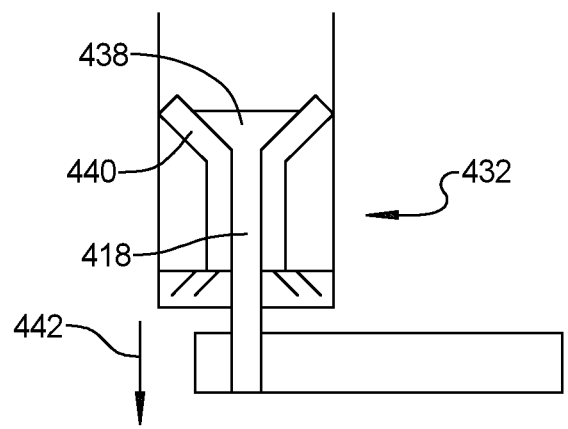
FIG. 18 is a schematic view of an energy absorbing device comprising an extrudable material.

Referring to FIG. 16, which is a schematic top view of a vehicle seat 310' with a passenger 20 seated therein, in an exemplary embodiment, the horizontal support rail 318' for the knee bolster 316' includes a support structure 334 within which the horizontal support rail 318' slides back and forth as indicated by arrow 336. The horizontal support rail 318' includes a knob 338 formed at a distal end thereof, and an energy absorbing material 340 positioned on and surrounding the horizontal support rail 318' between the knob 338 and a support surface 342 of the support structure 334. Referring to FIG. 17, forward motion of the knee bolster 316', as indicated by arrow 344, results in compression of the energy absorbing material 340 between the knob 338 and the support surface 342 of the support structure 334. As the energy absorbing material 340 is compressed, energy of the impact of the passenger's knees 22 on the knee bolster 316' is absorbed. Referring to FIG. 18, in another exemplary embodiment, an energy absorbing device 432 includes a flared conical shaped knob 438 formed at a distal end of the horizontal support rail 418. The horizontal support rail 418 is positioned within an extrudable material 440 such that forward motion of the knee bolster 316', as indicated by arrow 442, results in expansion of the extrudable material 440 and absorption of energy.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A knee bolster assembly for a vehicle seat, comprising:
a knee bolster moveably mounted in proximity to the vehicle seat, the knee bolster including a tray portion, the knee bolster and the tray portion having an L-shaped cross section;
the knee bolster selectively is configured to translationally move between a first position, wherein the knee bolster and tray portion are positioned to a side of the seating surface, and a second position, wherein the knee bolster is positioned directly in front of a seating surface and the tray portion is positioned above the seating surface, wherein the tray portion provides a working surface for a passenger when the knee bolster is in the second position; and
the knee bolster further including an energy absorbing device adapted to absorb energy when a perpendicular force is applied to the knee bolster by the passenger within the vehicle seat.

2. The knee bolster assembly of claim 1, wherein the knee bolster includes a rigid reaction plate and a padded member, the padded member attached to a surface of the rigid reaction plate facing the seating surface of the vehicle seat when the knee bolster is in the second position and made from a deformable material adapted to absorb energy when a generally perpendicular force is applied to the knee bolster by knees of the passenger within the vehicle seat.

3. The knee bolster assembly of claim 1, further including a locking mechanism adapted to secure the knee bolster in the second position, and at least one of a manual release and an automatic release adapted to allow selective release of the locking mechanism.

4. The knee bolster assembly of claim 3, further including external markings in proximity to the locking mechanism adapted to provide an indication of a location of the locking mechanism to direct a mechanic or first responder to the location of the locking mechanism.

5. The knee bolster assembly of claim 1, wherein lateral tracks attached to the knee bolster is slidably engage rails on the vehicle seat, allowing the knee bolster to be moveable perpendicularly, left and right, relative to the vehicle seat between the first position and the second position.

6. The knee bolster assembly of claim 1, wherein the knee bolster is adapted to be manually moved between the first position and the second position by the passenger seated within the vehicle seat.

7. The knee bolster assembly of claim 1, further including a first motor element adapted to move the knee bolster between the first position and the second position, wherein the knee bolster is adapted to automatically move from the first position to the second position in response to at least one of a plurality of first pre-determined conditions, and to move from the second position to the first position in response to at least one of a plurality of second pre-determined conditions.

8. The knee bolster of claim 7, wherein the knee bolster is adapted to automatically move from the first position to the second position only when a passenger restraint system for the passenger seated within the vehicle seat is engaged.

9. The knee bolster assembly of claim 1, wherein, when the knee bolster is in the second position, the knee bolster is adapted to selectively translate relative to the seating surface of the vehicle seat.

10. The knee bolster assembly of claim 1, wherein the energy absorbing device is adapted to allow dampened movement, relative to the vehicle seat, of the knee bolster when a perpendicular force is applied to the knee bolster by the knees of the passenger within the vehicle seat.

11. A vehicle seat, comprising:
a seating surface;
a knee bolster moveably mounted to the vehicle seat, the knee bolster including a tray portion, the knee bolster and the tray portion having an L-shaped cross section;
the knee bolster including a reaction plate and selectively moveable between a first position, wherein the knee bolster and tray portion are positioned to a side of the seating surface, and a second position, wherein the knee bolster is positioned directly in front of the seating surface and the tray portion is positioned above the seating surface, wherein the tray portion provides a working surface for a passenger when the knee bolster is in the second position;
a locking mechanism adapted to secure the knee bolster in the second position, and one of a manual release and an automatic release adapted to allow selective release of the locking mechanism;
the knee bolster further including an energy absorbing device adapted to absorb energy when a perpendicular force is applied to the knee bolster by the passenger within the vehicle seat; and
a first motor element adapted to move the knee bolster between the first position and the second position, wherein the knee bolster is adapted to automatically move from the first position to the second position in response to at least one of a plurality of first pre-determined conditions, and to move from the second position to the first position in response to at least one of a plurality of second pre-determined conditions wherein lateral tracks attached to the knee bolster slidably engage rails on the vehicle seat, the rails configured to translationally guide the knee bolster left and right relative to the vehicle seat between the first position and the second position.

* * * * *